US012675281B1

(12) United States Patent

Mifsud et al.

(10) Patent No.: US 12,675,281 B1
(45) Date of Patent: Jul. 7, 2026

(54) SIGNAL TO SOFTWARE INTERFACE MANAGEMENT

(71) Applicant: Amazon Technologies, Inc., Seattle, WA (US)

(72) Inventors: David Joseph Mifsud, Lake Stevens, WA (US); Michael Kenneth Dosenbach, Renton, WA (US); Shiro Ushijima, Belmont, MA (US); Maxim Petrenko, Bellevue, WA (US); Paolo Gruenberg Hilario, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 18/540,564

(22) Filed: Dec. 14, 2023

(51) Int. Cl.
G06F 9/44 (2018.01)
G06F 8/65 (2018.01)
G06N 20/00 (2019.01)

(52) U.S. Cl.
CPC .............. G06F 8/65 (2013.01); G06N 20/00 (2019.01)

(58) Field of Classification Search
CPC ........................................................ G06F 8/65
USPC ........................................................ 717/172
See application file for complete search history.

(56) References Cited

U.S. PATENT DOCUMENTS

| | | | | |
|---|---|---|---|---|
| 6,236,908 | B1 * | 5/2001 | Cheng ................. | F02D 41/0062 |
| | | | | 701/1 |
| 7,782,826 | B2 | 8/2010 | Olivier et al. | |
| 9,443,358 | B2 * | 9/2016 | Breed ........................ | G06F 8/65 |
| 10,140,099 | B2 | 11/2018 | Kintali | |
| 11,354,463 | B1 | 6/2022 | Babaali | |
| 11,743,334 | B2 | 8/2023 | Mendez Rodriguez | |
| 2016/0314224 | A1 * | 10/2016 | Wei ...................... | G05D 1/0088 |
| 2020/0294401 | A1 | 9/2020 | Kerecsen | |
| 2023/0282350 | A1 * | 9/2023 | Devore ................. | G16H 40/67 |
| 2023/0367778 | A1 * | 11/2023 | Winzell ................ | G06F 16/212 |
| 2024/0290139 | A1 * | 8/2024 | Blais ...................... | H04W 4/44 |

FOREIGN PATENT DOCUMENTS

EP    4465618  A1 *  11/2024   .............. H04W 4/38

OTHER PUBLICATIONS

"AI Code Generator-Amazon CodeWhisperer," AWS, retrieved from https://aws.amazon.com/codewhisperer/ on Dec. 14, 2023, pp. 1-17.

(Continued)

*Primary Examiner* — Evral E Bodden
(74) *Attorney, Agent, or Firm* — Alexander A. Knapp; Kowert, Hood, Munyon, Rankin & Goetzel, P.C.

(57) ABSTRACT

A signal to software interface management system generates a software code for implementing a signal to software interface to be deployed to a vehicle system component. The software interface management system may train a machine learning model using a plurality of types of vehicle signals and one or more vehicle specifications to generate the software code for implementing the signal to software interface. The signal to software interface may map a vehicle system component signal to a schema key associated with that vehicle system component, and may format the vehicle system component signal for use by a vehicle software according to a schema associated with the schema key.

20 Claims, 10 Drawing Sheets

(56)                  References Cited

OTHER PUBLICATIONS

"CAN Bus Explained—A Simple Intro [2023]," CSS Electronics, retrieved from https://www.csselectronics.com/pages/can-bus-simple-intro-tutorial on Dec. 14, 2023, pp. 1-34.
U.S. Appl. No. 18/192,351, filed Mar. 29, 2023, Roland Mesde, et al.
U.S. Appl. No. 17/709,236, filed Mar. 30, 2022, Edwin Ricardo Mendez Rodriguez, et al.

* cited by examiner

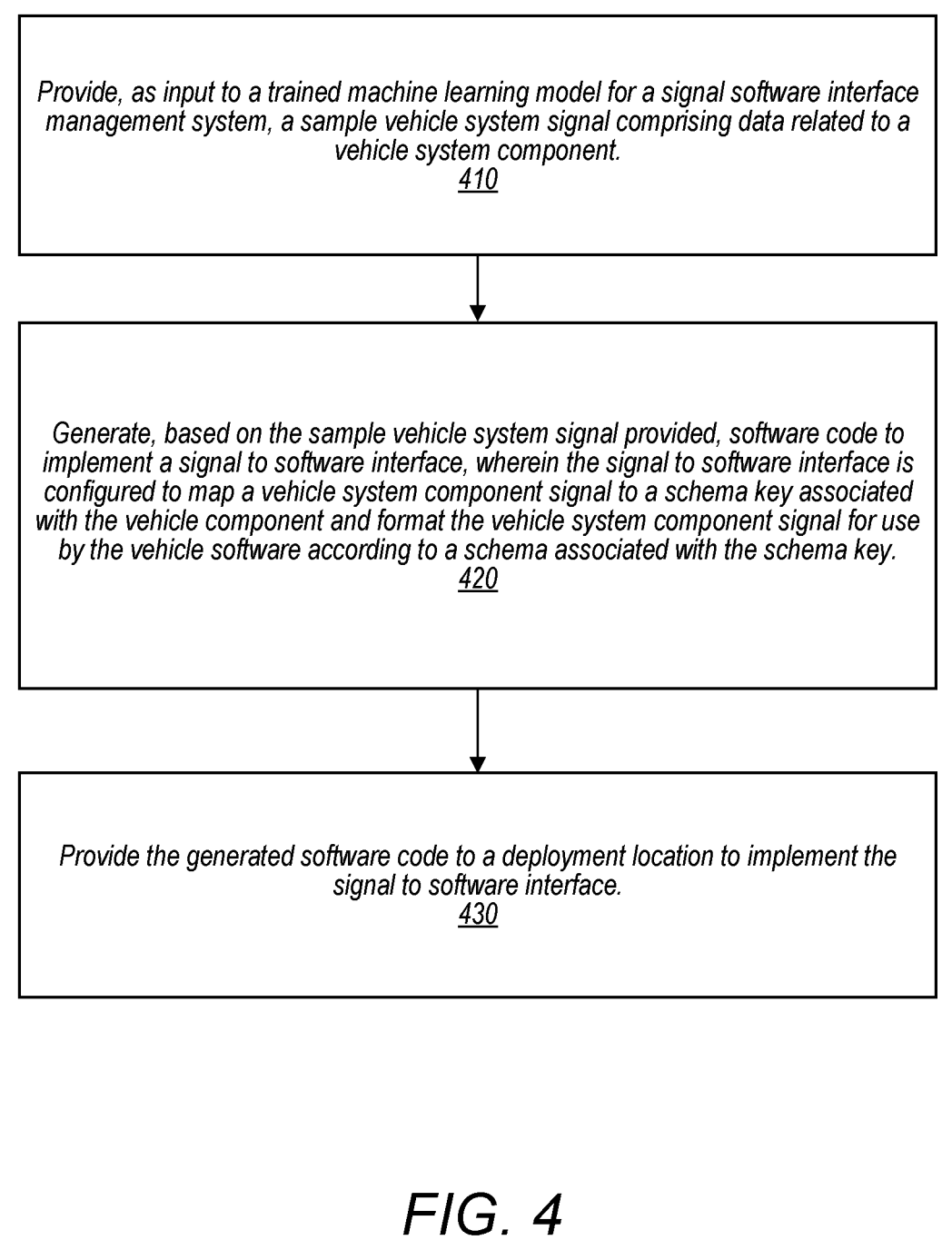

Provide, as input to a trained machine learning model for a signal software interface
management system, a sample vehicle system signal comprising data related to a
vehicle system component.
410

Generate, based on the sample vehicle system signal provided, software code to
implement a signal to software interface, wherein the signal to software interface is
configured to map a vehicle system component signal to a schema key associated
with the vehicle component and format the vehicle system component signal for use
by the vehicle software according to a schema associated with the schema key.
420

Provide the generated software code to a deployment location to implement the
signal to software interface.
430

FIG. 4

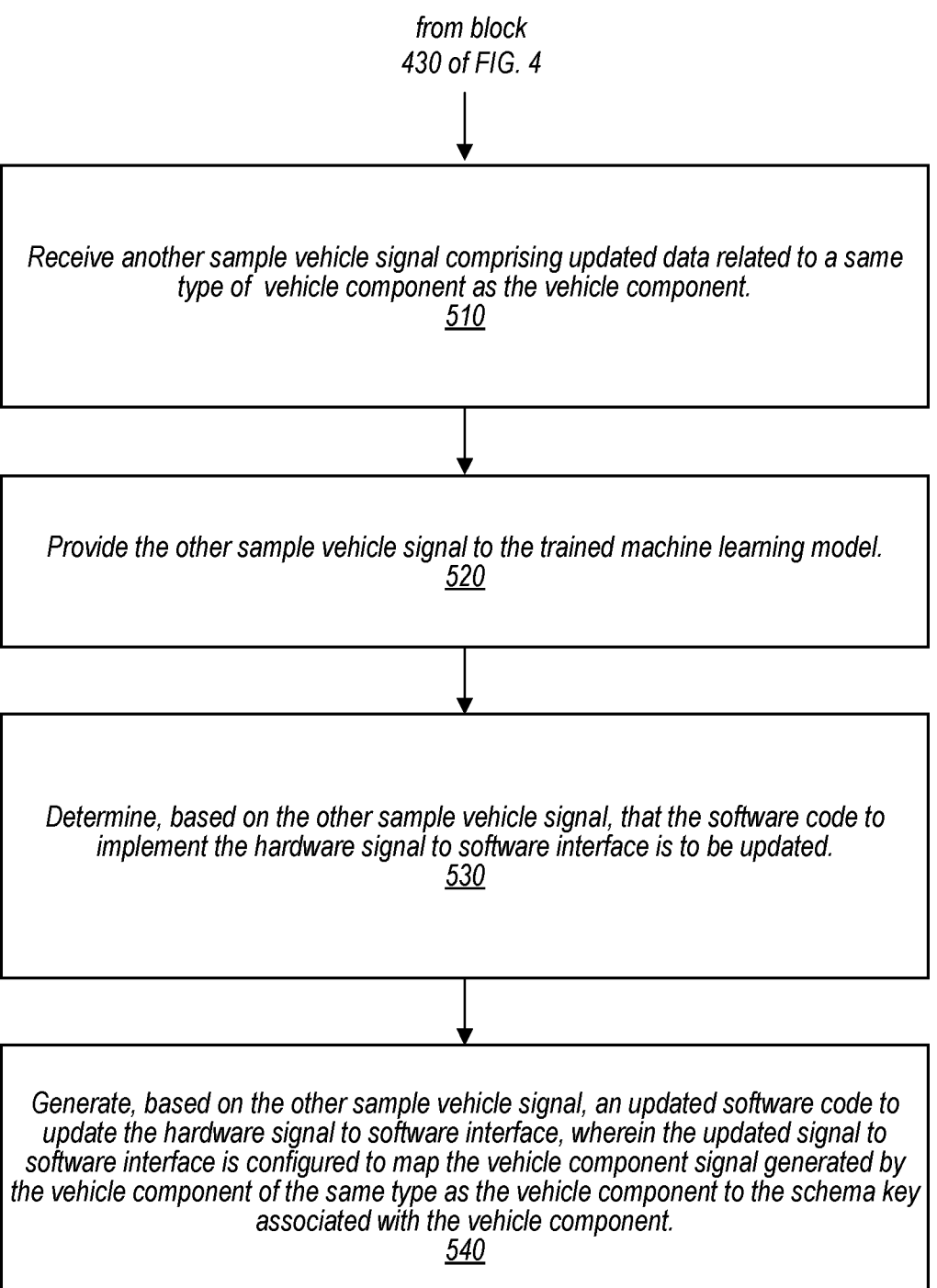

*from block*
*430 of FIG. 4*

*Receive another sample vehicle signal comprising updated data related to a same type of vehicle component as the vehicle component.*
*510*

*Provide the other sample vehicle signal to the trained machine learning model.*
*520*

*Determine, based on the other sample vehicle signal, that the software code to implement the hardware signal to software interface is to be updated.*
*530*

*Generate, based on the other sample vehicle signal, an updated software code to update the hardware signal to software interface, wherein the updated signal to software interface is configured to map the vehicle component signal generated by the vehicle component of the same type as the vehicle component to the schema key associated with the vehicle component.*
*540*

FIG. 5

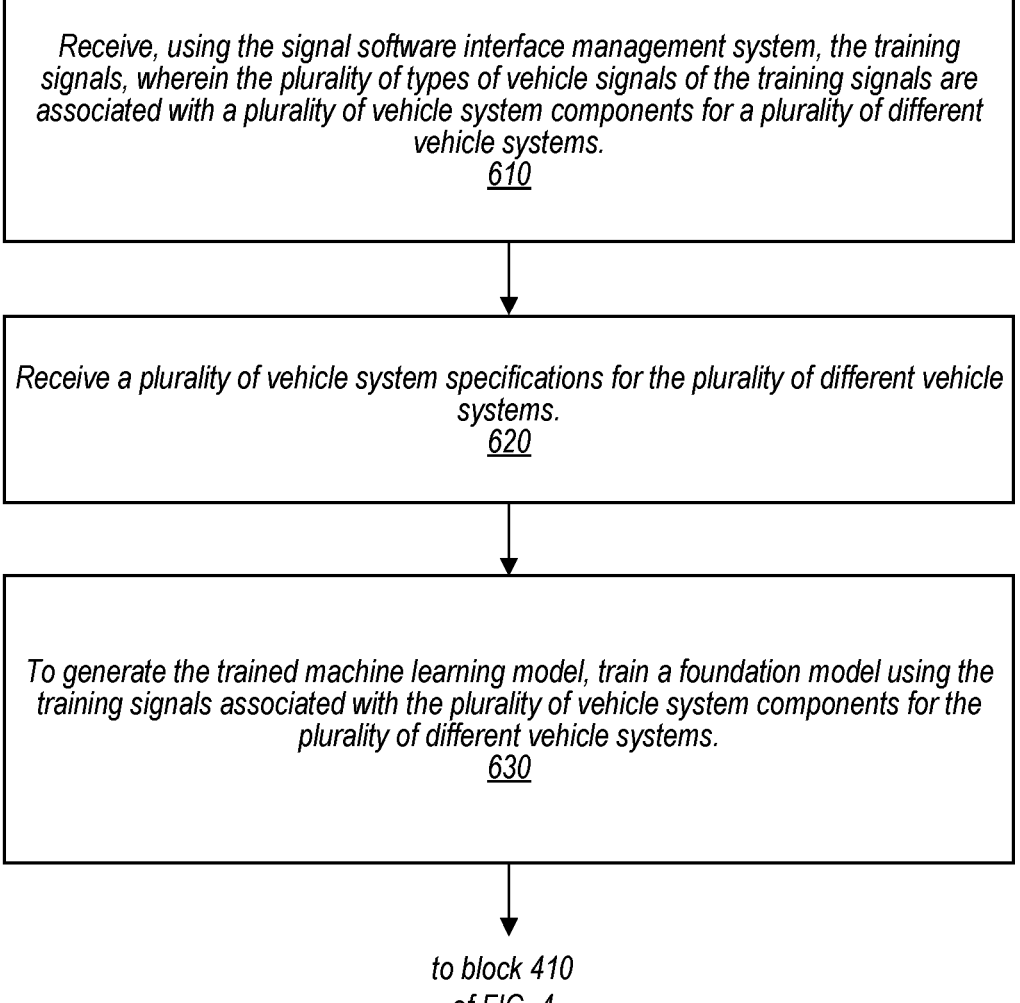

Receive, using the signal software interface management system, the training signals, wherein the plurality of types of vehicle signals of the training signals are associated with a plurality of vehicle system components for a plurality of different vehicle systems.
610

Receive a plurality of vehicle system specifications for the plurality of different vehicle systems.
620

To generate the trained machine learning model, train a foundation model using the training signals associated with the plurality of vehicle system components for the plurality of different vehicle systems.
630 to block 410
of FIG. 4

FIG. 6

SIGNAL TO SOFTWARE INTERFACE MANAGEMENT

BACKGROUND

Modern vehicles, such as cars, trucks, motorcycles, etc. are often manufactured with electronic sensors and include computer systems (e.g., electronic control units (ECUs)) programmed with control algorithms (e.g., software) that take inputs from such electronic sensors to determine various control actions to be taken for the vehicle or systems implemented in the vehicle. Software implemented on a vehicle may utilize various signals, including signals from vehicle components such as ECUs, actuators, sensors, etc. Some vehicles may include numerous pieces of software implemented using various combinations of hardware and/ or software resources, and may require one or more interfaces to interact with the various signals.

BRIEF DESCRIPTION OF THE DRAWINGS

FIG. 4 illustrates a flowchart of operations performed by a signal to software interface management system to generate software code for implementing a hardware signal to software interface, according to some embodiments.

FIG. 5 illustrates a flowchart of operations performed by a signal to software interface management system to generate an updated software code for use in updating a signal to software interface, according to some embodiments.

FIG. 6 illustrates a flowchart of operations performed by a signal to software interface management system to train a machine learning model to generate software code for use in implementing a signal to software interface, wherein the machine learning model is a foundation model, according to some embodiments.

Figure 1A:
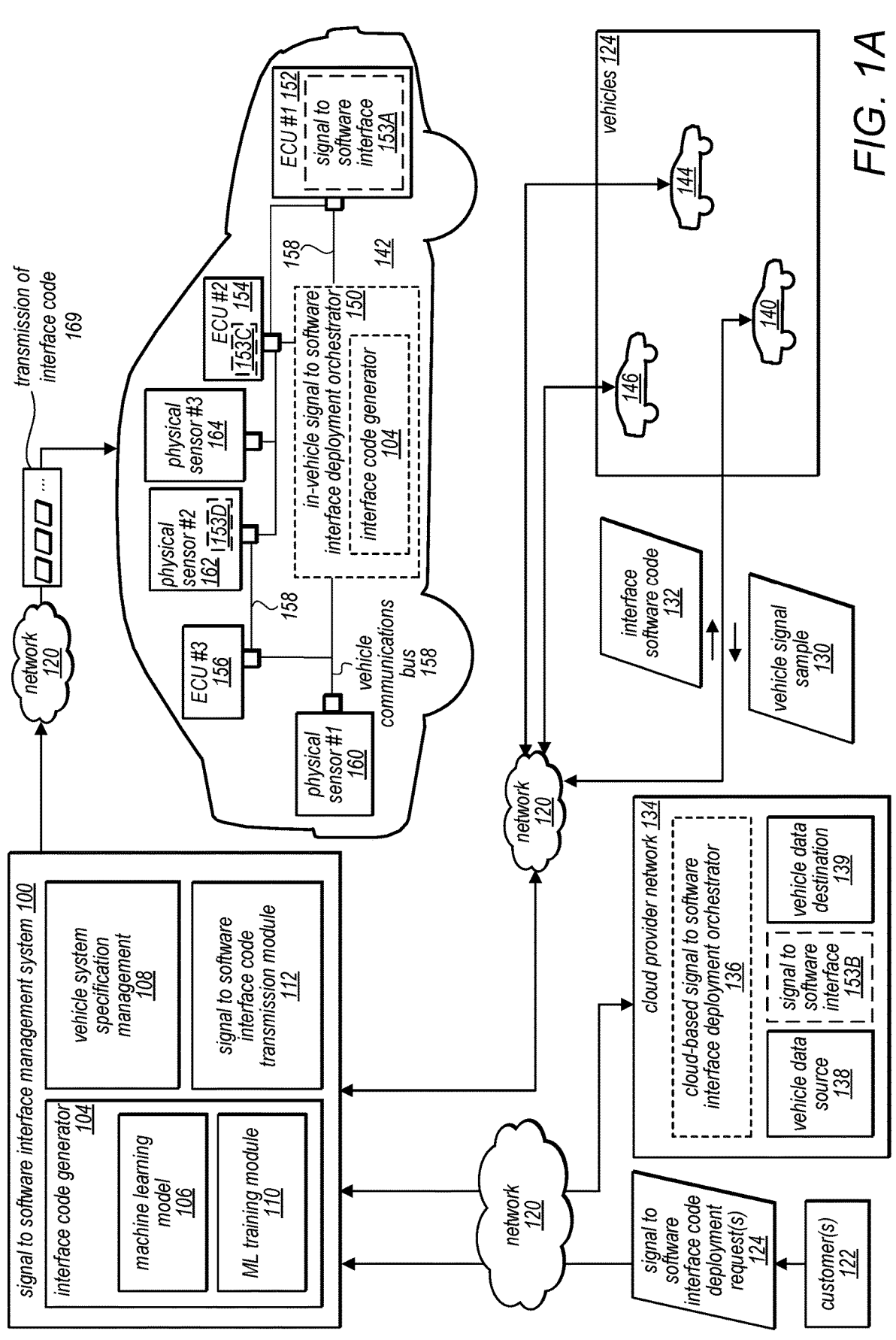
FIG. 1A illustrates a signal to software interface management system that generates software code for implementing a signal to software interface to be deployed to one or more vehicle system destinations, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a signal to software interface management system that trains a machine learning model to generate software code for implementing a signal to software interface, wherein the signal to software interface is configured to be implemented on a vehicle system component (e.g., a component of a vehicle or a component of a cloud provider network). The signal to software interface management system may train a machine learning model (e.g., a foundation model) to generate the software code, wherein the training is performed with training data comprising a plurality of types of vehicle signals and one or more vehicle specifications. The signal to software interface generated using the trained machine learning model may be configured to map a vehicle system component signal directed to, or received from, a component of the vehicle to a schema key associated with that vehicle system component. The schema key may represent one or more attributes of a vehicle system component signal in a communication used by software for the vehicle system. Once implemented in a vehicle and/or a cloud service provider network, the signal to software interface may format a vehicle system component signal for use by a vehicle software component according to a schema associated with the schema key. Said another way, the signal to software interface may function as a "glue" code that allows signals (e.g., from sensors or directed to actuators) to be interpreted by software deployed in the vehicle that was not designed to natively interact with the signals.

For example, at least one difficulty in production and maintenance of vehicles is a difficulty related to generating signal to software interfaces that are required to enable interactions with various types of vehicle system component signals. For example, a vehicle may comprise a network of sensors with various embedded software elements that generate disparate types of signals. Furthermore, the vehicle may comprise various compute elements that are connected to the sensors, such as high-performance compute units (e.g., domain controllers or virtual electronic control units). These various compute elements may implement various pieces of software. Thus, there may be a wide variety of signal types used in a vehicle and a wide variety of software configurations used in the vehicle wherein the software configurations need to be able to interpret the various types of signals. Each of these various components may generate or interpret signals according to different schemas, and, in order for, respective instances of software (such as those executing on separate vehicle components from the sensors) to use the various types of signals, a signal to software interface may be required to map respective types of signals to a schema key and accordingly format respective signals according to a schema associated with the schema key (e.g. convert the signal into a format the recipient software is formatted to understand). Moreover, because vehicle system component signals (that are produced or consumed) may differ model to model (for example due to differences between the vehicle component model or vehicle component manufacturer), a signal to software interface may be required to be tailored to each variation. For example, a vehicle model "A" built in 2025 may generate at least some different types of signals than the same vehicle model "A" built in 2026. Each of the different models may therefore require a different signal to software interface. As another example, a first vehicle model "A" with a "sunroof" option may produce at least some different signals than a second vehicle model "A" without the "sunroof" option.

Moreover, differences in vehicle software that consumes the generated signal, may require different signal to software interfaces. For example, in some embodiments, brake pressure analysis software and fuel efficiency analysis software may require different signal to software interfaces in order to use a same signal generated by a tire pressure sensor. Different signal to software interfaces may be required as each of the software (e.g., the brake pressure analysis software and the fuel efficiency analysis software) may require the signal to be translated to their own respective schema keys. In some embodiments, the different software may all be in accordance with a signal catalog and may share the same schema key (and therefore may require a single signal to software interface). In some embodiments, the signals may be raw hardware signals and the signal to software interface may be a hardware signal interface ("HSI") that provide a middleware layer. The HSI may allow developers of a vehicle software to use the HSI (and the schema key associated with the HSI) without having to know the specific raw signal and hardware of the raw signal.

Furthermore, generating code for the various signals may be an error prone process given the number of different signals to software interfaces that may be required to be deployed in a given vehicle system. For example, a tire pressure sensor of a vehicle model "A" manufactured in North America and another tire pressure sensor of the same vehicle model "A" manufactured in South America may use different embedded software using differing units. For example, the first tire pressure sensor may use pounds per square inch ("psi") while the latter may use kilopascals ("kPa"). A signal to software interface that does not factor in the differences between the two different tire pressure sensors may result in an error in pressure. In some embodiments, vehicle components of differing manufacturing plants may require different signal to software interfaces. In some embodiments, after-market vehicle components may require a different signal to software interface than a signal to software interface of an original equipment.

As discussed above, generating code specifically designed for the various signals may be time consuming, error prone, and resource intensive. Thus, original equipment manufacturers (OEMs), vehicle software developers, and other stakeholders may benefit from a signal to software interface management system that that generates "glue" code for implementing a signal to software interface for one or more signals in a desired vehicle system.

In some embodiments, a signal to software interface management system may train a machine learning model to generate software code (e.g., "glue" code) that implements a signal to software interface for a vehicle and/or a cloud provider network. The signal to software interface management system may train a machine learning model (such as a foundation model or other machine learning models) with training data. The training data may comprise a plurality of types of vehicle signals and one or more vehicle specifications. Once trained, the machine learning model may be provided with a sample signal comprising data associated with a vehicle system component. The machine learning model may generate software code (e.g., "glue" code) that implements the signal to software interface to be deployed to a deployment location. In some embodiments, the software code (e.g., "glue" code) that implements the signal to software interface may be deployed to a component in a vehicle or a component in a cloud provider network. For example, in some embodiments, the signal to software interface management system may generate software code to be deployed to one or more components in a vehicle (e.g., an ECU of the vehicle). In some embodiment, the signal to software interface management system may provide the software code that has been generated to an in-vehicle signal software interface deployment orchestrator which in turn orchestrates the deployment of the software code to a component in the vehicle. In some embodiments, the software interface management system may generate software code to be deployed to one or more components on a cloud provider network (e.g., a compute node of a cloud provider network). In some embodiment, the signal to software interface management system may provide the software code that has been generated to a cloud-based signal software interface deployment orchestrator which in turn orchestrates the deployment of the software code to a component in the cloud provider network.

In some embodiments, at least a portion of the signal to software interface management system may be implemented in a vehicle. For example, an in-vehicle signal software interface deployment orchestrator for a signal to software interface management system may be implemented in the vehicle, wherein the in-vehicle signal software interface deployment orchestrator may obtain a machine learning model that has been trained in the cloud. The in-vehicle signal software interface deployment orchestrator may use the trained machine learning model to generate software code implanting a signal to software interface. The trained machine learning model may obtain a sample vehicle signal from the vehicle and generate software code that implements a signal to software interface using the trained machine learning model. In some embodiments, the in-vehicle signal software interface deployment orchestrator may deploy the generated software code to one or more components in the vehicle.

The signal to software interface implemented using code generated by the signal to software interface management system may be configured, when deployed, to map a vehicle system component signal directed to, or received from, a component of the vehicle to a schema key associated with that vehicle system component. The schema key may be used to represent one or more attributes of the vehicle system component signal in a communication used by a given vehicle software for the vehicle. In some embodiments, once implemented in a vehicle and/or a cloud service provider network, a signal to software interface may format the vehicle system component signal for use by the vehicle software component according to a schema associated with the schema key. In some embodiments, the signal to software interface may be configured to map a processed signal (e.g., an output of another signal-to-software interface) to a schema key. For example, an output of a first signal-to-software interface that has been formatted according to a schema associated with a first schema key may be provided as input to a second signal-to-software interface. The second signal-to-software interface may be mapped to a second schema key and formatted according to a schema associated with the second schema key.

FIG. 1A illustrates a signal to software interface management system that generates software code for implementing a signal to software interface to be deployed to one or more vehicle system destinations, according to some embodiments.

A vehicle system may include a signal to software interface management system 100 and be connected to vehicles 140, 142, 144, and 146 via network 120. Although FIG. 1 illustrates four vehicles 140, 142, 144, and 146 connected to the signal to software interface management system 100 via the network 120, this illustration is intended only as an example and it should be understood that any number of vehicles may form one or more fleets of vehicles connected to the network 120. In some embodiments, network 120 may be connected to vehicles that contain various components configured to send and receive signals using different vehicle signal formats and/or that include various ECU environments. In some embodiments, the vehicles may use a plurality of different vehicle signal formats using one or more bus types. For example, vehicle 142 may include a Controller Area Network (CAN) bus using a CAN bus protocol and/or a Controller Area Network Flexible Data-rate (CAN FD) protocol. As another example, vehicle 142 may include a Local Interconnect Network (LIN) bus using a LIN bus protocol. As another example, vehicle 142 may include an ethernet bus using a service-Oriented MiddlewarE over IP (SOME/IP) and/or a Transmission Control Protocol/Internet Protocol (TCP/IP). In some embodiments, a vehicle communications bus 158 of the vehicle 142 may comprise one or more types of buses and may connect one or more vehicle components.

In some embodiments, one or more customers 122 may furthermore, be connected to the signal to software interface management system 100 via the network 120. The one or more customers 122 may be vehicle suppliers or vehicle component suppliers (e.g., vehicle original equipment manufacturers (OEMs) and/or parts suppliers), as a few examples. Network 120 may be a private or public network such as a direct connect connection to a service provider network hosting the signal to software interface management system 100, or an Internet connection. Network 120 may furthermore be a wireless network, such as a cellular network, Wi-Fi network or other wireless network. In some embodiments, the vehicles 140, 142, 144, and 146 may be connected to multiple types of networks and not just to one type of network.

In some embodiments, the signal to software interface management system 100 may include an interface code generator 104, a machine learning model 106, a machine learning ("ML") training module 110, a vehicle system specification management 108, and a signal to software interface code transmission module 112. The interface code generator 104 may generate software code that implements a signal to software interface 153 for one or more components of a vehicle system. For example, the signal to software interface management system 100 may generate software code for a signal to software interface to be deployed to a component in a single vehicle, such as the vehicle 142, code for a signal to software interface to be deployed to components in multiple vehicles, such as components in a fleet of vehicles 140, 142, and 146, or code for a signal to software interface to be deployed to a component in a cloud provider network 134. The code that implements the signal to software interface may be generated/deployed based on one or more signal to software interface code deployment request(s) 124.

In some embodiments, the signal to software interface management system 100 may provide the software code for implementing the signal to software interface 153 directly to a deployment location (e.g., an electronic control unit 152 (ECU #1), cloud provider network 134, etc.) and/or may alternatively provide the software code to a deployment orchestrator to deploy the software code to the deployment location. For example, in some embodiments, the signal to software interface code transmission module 112 of the signal to software interface management system 100 may send the software code for implementing a signal to software interface 153A to an in-vehicle signal to software interface deployment orchestrator 150 that deploys the code for the signal to software interface 153A at the ECU #1 (152). In another example, the signal to software interface code transmission module 112 of the signal to software interface management system 100 may send the software code to implement a signal to software interface 153B to a cloud-based signal to software interface deployment orchestrator 136 that deploys the code to a deployment destination (e.g., a component of the cloud provider network 134). In some embodiments, the signal to software interface management system 100 may communicate with vehicles using one or more protocols, including a Message Queuing Telemetry Transport (MQTT) protocol, a Constrained Application Protocol (CoAP), an Extensible Messaging and Presence Protocol (XMPP), an Advanced Message Queuing Protocol (AMQP), and/or a Data Distribution Service (DDS). The signal to software interface code transmission module 112 and deployment of the software code for the signal to software interface will be further discussed in FIG. 2B and FIG. 3.

In some embodiments, the customer(s) 122 may indicate a signal to software interface code deployment request(s) 124 is for a particular deployment location where the signal to software interface is to be deployed in the vehicle system (e.g., an electronic control unit 152 (ECU #1) or a component in the cloud provider network 134). Although not illustrated, in some embodiments, a control plane of the signal to software interface management system 100 may allow customer(s) 122 to perform various actions required to deploy software code for the signal to software interface as well as update the signal to software interface. A control plane of the signal to software interface management system 100 may furthermore be used to configure the vehicle system specification management system 108. The vehicle system specification management system 108 may maintain a plurality of specifications for a plurality of vehicles. For example, the vehicle system specification management system 108 may obtain vehicle specification files, such as a Database Container (DBC) file or an Extensible Markup Language (XML) file that describes the specifications of a particular vehicle (or a particular type of vehicle). For example, a DBC file may outline communication param-
eters, such as various compute nodes (e.g., ECUs), mes-
sages, and signals, as well as schema keys used in vehicle
software that are associated with specific signals. In another
example, an XML file may indicate vehicle attributes com-
prising model name, production year, engine specifications,
transmission details, and schema keys. The signal to soft-
ware interface implemented in the vehicle 142 (e.g., the
signal to software interface 153A) will be further discussed
in FIG. 1B. The signal to software interface implemented in
the cloud provider network 134 (e.g., the signal to software
interface 153B) will be further discussed in FIG. 1C.

In some embodiments, the signal to software interface
code transmission module 112 may ingest one or more
vehicle signal samples 130 from the vehicles 140, 142, 146,
and 146 or from the cloud provider network 134. The
interface code generator 104 may provide an ingested signal
sample to the machine learning model for use in determining
a pattern of the signals included in the sample signal. The
ML training module 110 may train the machine learning
model 106 to detect patterns in the signals. Furthermore, the
ML training module 110 may train the machine learning
model 106 to generate the signal to software interface code.
In some embodiments, the ML training module 110 may
perform the training of the machine learning model 106
using a training set that comprises a plurality of vehicle
signals and one or more vehicle specification. For example,
the ML training model 110 may train the machine learning
model 106 using a training set comprising, a vehicle bill of
materials (BOM), specifications associated with respective
ones of the components specified in the BoM, schema keys
associated with the vehicle components (wherein a schema
key represents one or more attributes of the vehicle system
component signal in a communication used by a given
vehicle software for the vehicle), and schema associated
with the schema key. In some embodiments, the machine
learning model 106, may be a foundation model. The
foundation model may be a model that is trained to generate
software code to implement the signal to software interface
for a plurality of different vehicle models and may not be
required to be trained for a specific type of vehicle model.
The machine learning model 106, the ML training module
110, and training of the machine learning model 106 are
further discussed in FIG. 2A.

In some embodiments, in-vehicle signal to software inter-
face deployment orchestrator 150 may receive the transmis-
sion of the interface code (169) generated by the machine
learning model 106. Although not illustrated in detail, the
in-vehicle signal to software interface deployment orches-
trator 150 may be implemented in an ECU or other com-
puting unit of the vehicle 142. The in-vehicle signal to
software interface deployment orchestrator 150 may provide
an in-vehicle receive module (such as a receive module 314
discussed in FIG. 3). In some embodiments, the vehicle
communications bus 158 of the vehicle 142 may transmit
vehicle information sent from various components of the
vehicle 142, such ECU #1 (152), electronic control unit 154
(ECU #2), and electronic control unit 156 (ECU #3). Addi-
tionally, other components, such as physical sensor #1 (160),
physical sensor #2 (162), and physical sensor #3 (163) may
be connected to one or more of the vehicle communications
buses 158 and/or ECUs of the vehicle. In some embodi-
ments, the various physical sensors may be connected to
multiple vehicle communications buses and/or physical sen-
sors. For example, in the vehicle 142, physical sensor 162
(physical sensor #2) may be connected to ECU #2 (154) as
well as ECU #3 (156) via the vehicle communications bus

158. Various vehicle communications bus 158 connections
may provide alternate sensor signal paths. As will be further
discussed in FIG. 1B various portions of the vehicle com-
munication buses 158 may be different types of buses and/or
buses that use different types of in-vehicle communication
protocols. The in-vehicle communications protocols used in
the vehicle 142 may include a controller area network
(CAN) protocol, a remote procedure call (RPC) protocol, a
controller area network flexible data-rate (CAN FD) proto-
col, a low-speed CAN protocol, a high-speed CAN protocol,
a Society of Automotive Engineers (SAE) J1939 protocol, a
CANopen protocol, LIN bus protocol, SOME/IP protocol,
TCP/IP protocol, and/or an on-board diagnostics (OBD)
protocol.

The various vehicles 140, 142, 146, and 146 may generate
vehicle signal sample 130 containing various pieces or types
of vehicle information that are sent to the signal to software
interface management system 100. In some embodiments,
the vehicle signal sample may be sent with specification data
for the vehicle 142, including component attribute informa-
tion for the physical sensor #1 (160), physical sensor #2
(162), and physical sensor #3 (164), and/or an ECU con-
figuration of the vehicle 142 including an ECU #1 (152),
ECU #2 (154), and/or ECU #3 (156) configuration. In some
embodiments, the signal to software interface code trans-
mission module 112 may provide a portion of the vehicle
signal sample 130 along with the vehicle specification data
for the machine learning model 106 to generate code that
implements a signal to software interface for one or more
signals detected in the sample signal. For example, in some
embodiments, the vehicle signal may include compressed
data such as video frames, images, radar amplitude, tem-
perature data, engine speed, driver's performance, and/or
other signals generated by one or more components of the
vehicle 142. In some embodiments, the vehicle component
signal may be a compressed signal that conforms to a binary
format or a protocol buffer ("protobuf") format. The
machine learning model may generate interface code that
maps the signal to the correct schema key associated with
that vehicle system component. The interface code that is
generated may furthermore be configured to format the
signal into the schema associated with the schema key. In
some embodiments, the signal to software interface 153A
may allow software in the vehicle (or if deployed in the
cloud provider network 134, a vehicle data destination 139)
to be able to use the signal that has been formatted by the
signal to software interface.

Figure 1B:
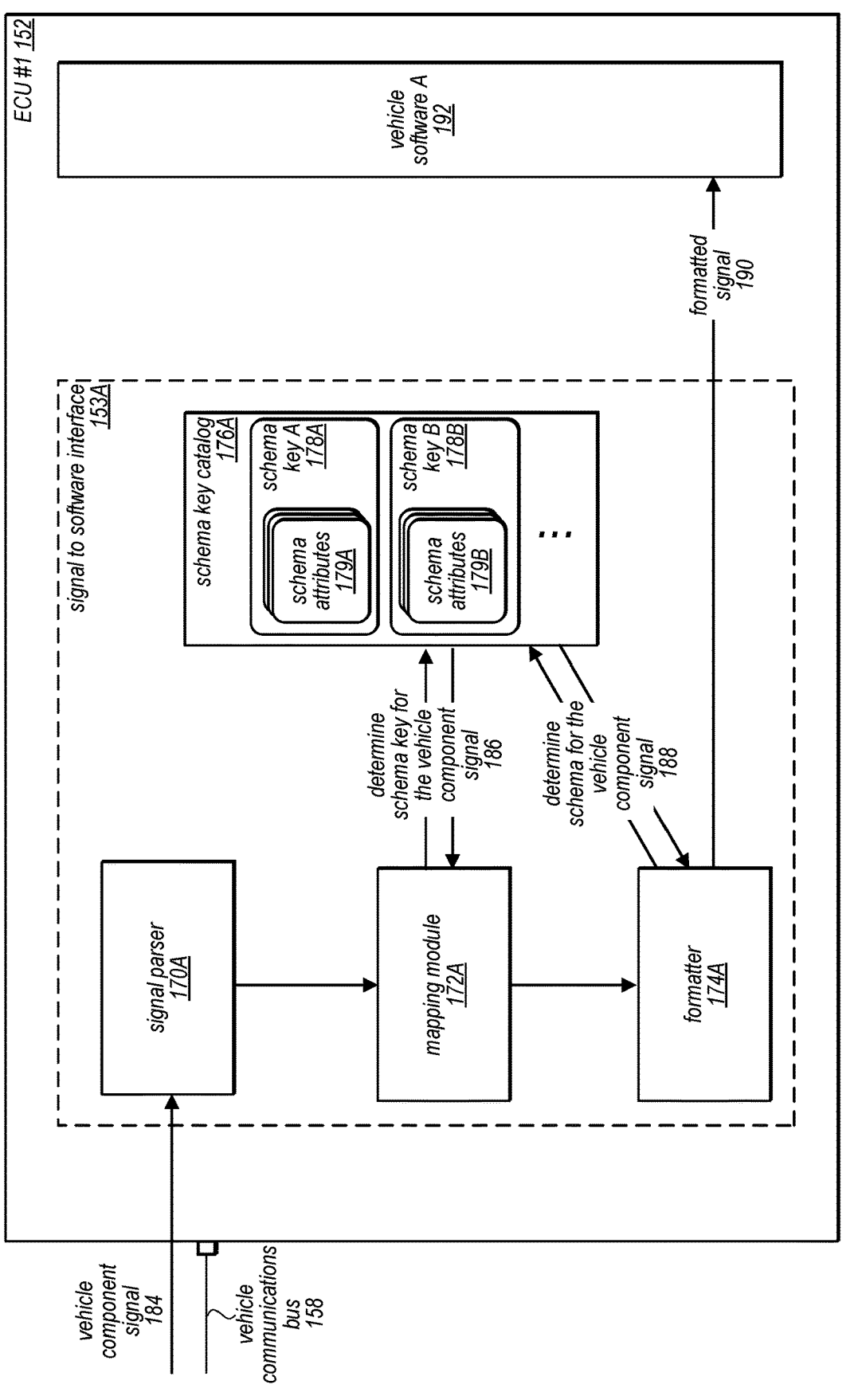
FIG. 1B illustrates a more detailed view of a signal to software interface implemented using code generated by the signal to software interface management system, wherein the generated code is deployed to a vehicle system destination at a vehicle, according to some embodiments.

FIG. 1B illustrates a more detailed view of a signal to
software interface implemented using code generated by the
signal to software interface management system, wherein
the generated code is deployed to a vehicle system destina-
tion at a vehicle, according to some embodiments.

In some embodiments, a signal to software interface 153A
may be deployed to an ECU #1 (152) of a vehicle. As
discussed in FIG. 1A, software code that implements the
signal to software interface 153A may be generated by a
signal to software interface management system 100. The
signal to software interface 153A may comprise a signal
parser 170A, a mapping module 172A, a formatter 174A,
and a schema key catalog 176A. In some embodiments, the
schema key catalog 176A may comprise various schema
keys, such as schema key A 178A (that represents schema
attributes 179A) and schema key B 178B (that represents
schema attributes 179B). In some embodiments, the signal
to software interface 153A may be deployed using a separate
in-vehicle signal to software interface deployment orches-
trator 150 implemented in an ECU of the vehicle. The deployment of the signal to software interface 153A is further discussed in FIGS. 2B and 3.

In some embodiments, the signal parser 170A may receive vehicle component signal 184 via a vehicle communications bus 158. The vehicle communications bus 158 may comprise one or more types of buses supporting various communication protocols, including CAN and SOME/IP as discussed in FIG. 1A. In some embodiments, the vehicle component signal 184 may comprise signals from various vehicle system components (e.g., a tire pressure sensor, an infotainment system, ECU, etc.). The signal parser 170A may process the various vehicle component signals of the vehicle component signal 184 (e.g., a hardware signal). For example, the signal parser 170A may perform one or more tasks to parse the various parts of the vehicle component signal 184 to decipher the vehicle component signal data. The one or more tasks to parse the various parts of the vehicle component signal 184 may include tasks such as digital conversion, noise filtration, and application of algorithms. The signal parser 170A may identify a specific vehicle component signal. The mapping module 172A may use the identified specific vehicle component signal to map the specific vehicle component signal to a specific schema key.

In some embodiments, the mapping module 172A may determine 186 a schema key for the vehicle component signal to be mapped to. For example, the mapping module 172A may determine from the schema key catalog 176A that a schema key A 178A (that represents schema attributes 179A) is to be mapped to the vehicle component signal identified by the signal parser 170A. In some embodiments, the schema key may represent a unique identifier or attribute associated with the structure and organization of the data. For example, the schema key may be node-based path identifier, such as "vehicle.chassis.row_one.tire.right", wherein the node-based path identifier maps a raw vehicle component signal from a front right tire sensor to the identifier. The mapping between the vehicle component signal and the schema key may allow a vehicle software (e.g., vehicle software A 192) to interact with the vehicle component signal regardless of the specific vehicle component that are in the vehicle.

In some embodiments, the formatter 174A of the signal to software interface 153A may determine 188 a schema for use in formatting the vehicle component signal. For example, the formatter 174A may determine that a schema associated with schema key A 178A (that represents the schema attributes 179A) is to be used to format the vehicle component signal. In some embodiments, the formatter 174A may format the vehicle component signal to the schema associated with the schema key. For example, the formatter 174A may format the vehicle component signal according to corresponding fields, units, and data types that are associated with the schema attributes 179A of the schema key A 178A. The formatter 174A may furthermore format the vehicle component signal in compatible file formats, such as XML or JSON. For example, the signal parser 170A may provide a tire pressure signal to the formatter 174A using a DataBase Container ("DBC") format, wherein the tire pressure signal uses PSI as a unit of measurement. The mapping module 172A may map the tire pressure signal to a schema key "vehicle.chassis.row_one-.tire.right" that represents schema attributes, wherein a schema associated with the schema key indicates that the pressure is to be in a different unit of measurement (e.g., kPa). Based on schema associated with the schema key (e.g., "vehicle.chassis.row_one.tire.right"), the formatter may convert the pressure values into kPa and format the information to be communicated using an XML file format. In some embodiments, the formatter 174A may provide formatted signal 190 to a vehicle software 192. In some embodiments, the signal to software interface 153A may provide the formatted signal 190 to another vehicle system component (e.g., ECU #2 (154)).

Figure 1C:
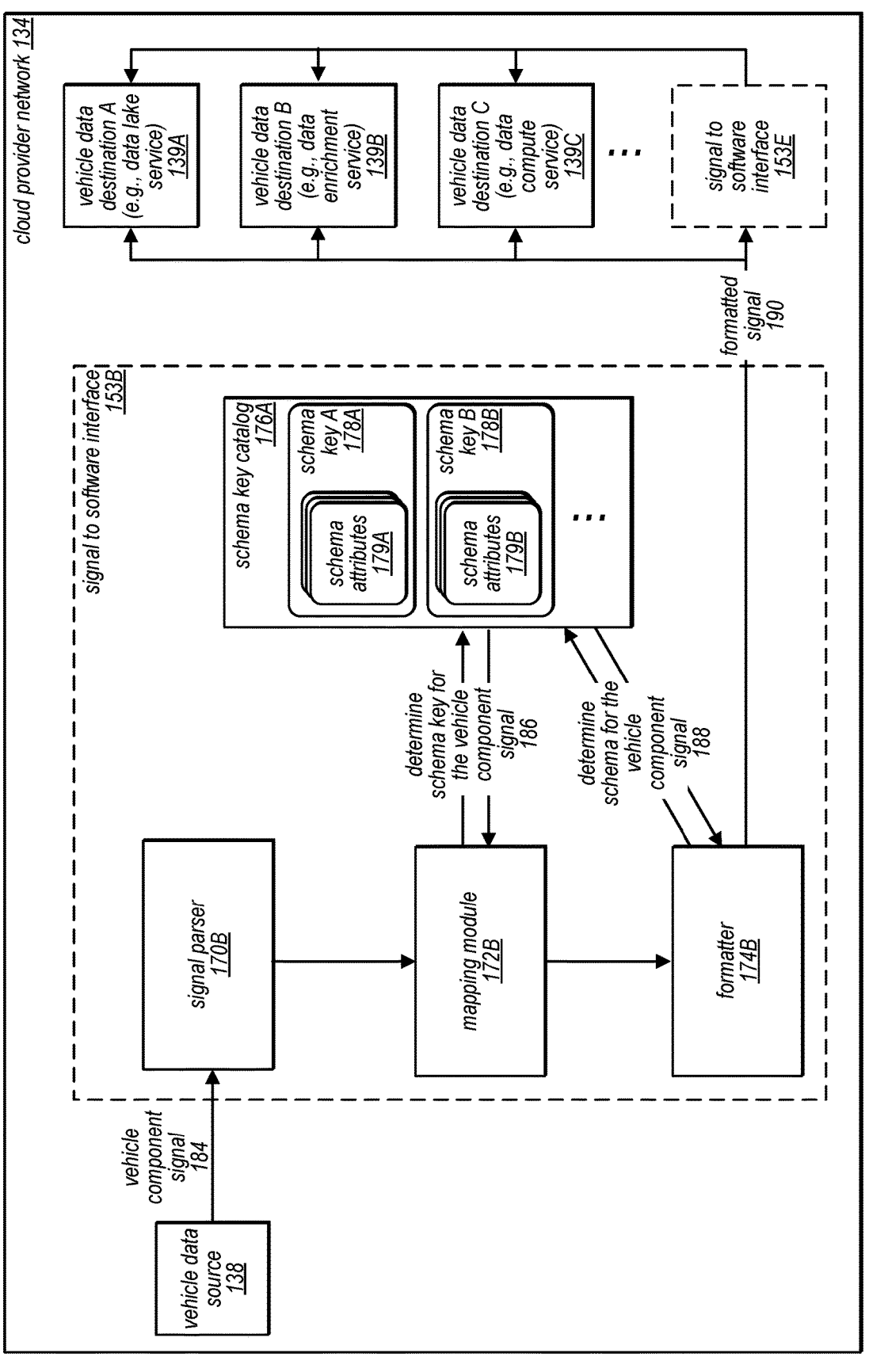
FIG. 1C illustrates a more detailed view of a signal to software interface implemented using code generated by the signal to software interface management system, wherein the generated code is deployed to a vehicle system destination in a cloud provider network, according to some embodiments.

FIG. 1C illustrates a more detailed view of a signal to software interface implemented using code generated by the signal to software interface management system, wherein the generated code is deployed to a vehicle system destination in a cloud provider network, according to some embodiments.

In some embodiments, a signal to software interface 153B may be deployed to a cloud provider network 134 of a vehicle system. As discussed in FIG. 1A, software code that implements the signal to software interface 153B may be generated by a signal to software interface management system 100. In some embodiments, the software code may be for implementation in the cloud provider network 134. Similar to the signal to software interface 153A discussed in FIG. 1B, the signal to software interface 153B may comprise a signal parser 170B, a mapping module 172B, a formatter 174B, and a schema key catalog 176B. The schema key catalog 176B may comprise various schema keys, such as schema key A 178A (that represents schema attributes 179A) and schema key B 178B (that represents schema attributes 179B). In some embodiments, the signal to software interface 153B may be deployed using a separate cloud-based signal to software interface deployment orchestrator 150 implemented in the cloud provider network 134.

In some embodiments, similar to the signal parser 170A discussed in FIG. 1B, the signal parser 170B may receive vehicle component signal 184 from one or more vehicle data sources. For example, a vehicle data source 138 may be a service on the cloud provider network 134. The vehicle data source 138 may be one or more services of the cloud provider network 134, such as data lake services (e.g., object storage services, block storage services, and file storage services), database services, ML services, data enrichment services, and data compute services. In some embodiments, the vehicle data source 138 may be a vehicle data stream for one or more raw signals generated by a vehicle component in a vehicle, wherein the one or more raw signals generated by a vehicle component are ingested by the cloud provided network 134 using the vehicle data stream.

In some embodiments, the signal to software interface 153B may be implemented in a resource of the cloud provider network 134, such as a compute instance. Similar to the signal parser 170A discussed in FIG. 1B, the signal parser 170B may process the various vehicle component signals of the vehicle component signal 184. For example, the signal parser 170B may perform one or more tasks to parse the various parts of the vehicle component signal 184 from a vehicle data stream. As discussed in FIG. 1B, the mapping module 172B may map a specific vehicle component signal to a specific schema key.

Similar to the mapping module 172A and formatter 174A discussed in FIG. 1B, the mapping module 172B may determine 186 a schema key for the vehicle component signal to be mapped to. In some embodiments, the formatter 174B may format the vehicle component signal to the schema associated with the schema key. In some embodiments, the formatter 174B may provide a formatted signal 190 to one or more vehicle data destinations. For example, the formatted signal 190 may be provided to a vehicle data destination A 139A (e.g., a data lake service), a vehicle data destination B 139B (e.g., a data enrichment service) and a vehicle data destination C 139C (e.g., a data compute service). In some embodiments, a data destination that the formatted signal 190 is sent to may be another signal to software interface 153E. In some embodiments, there may be multiple signals to software interfaces that are connected to one another. For example, the signal to software interface 153B generated by the signal to software interface management system 100, may be configured to take in vehicle component signal 184 from vehicle data source 138 (e.g., a signal to software interface). The signal parser 170B may take in a signal that is mapped to another schema key of the vehicle data source signal to software interface. The mapping module 172B may be configured to determine 186 that schema key B 179B is to be mapped to the vehicle component signal. The formatter 174B may be configured to format the vehicle system component signal conforming to a different schema (associated with another schema key) to conform to the schema of the schema key B 178B (wherein the schema key B 178B represents the schema attributes 179B). In some embodiments, the formatted signal 190 may be sent to an additional signal to software interface 153E.

Figure 2A:
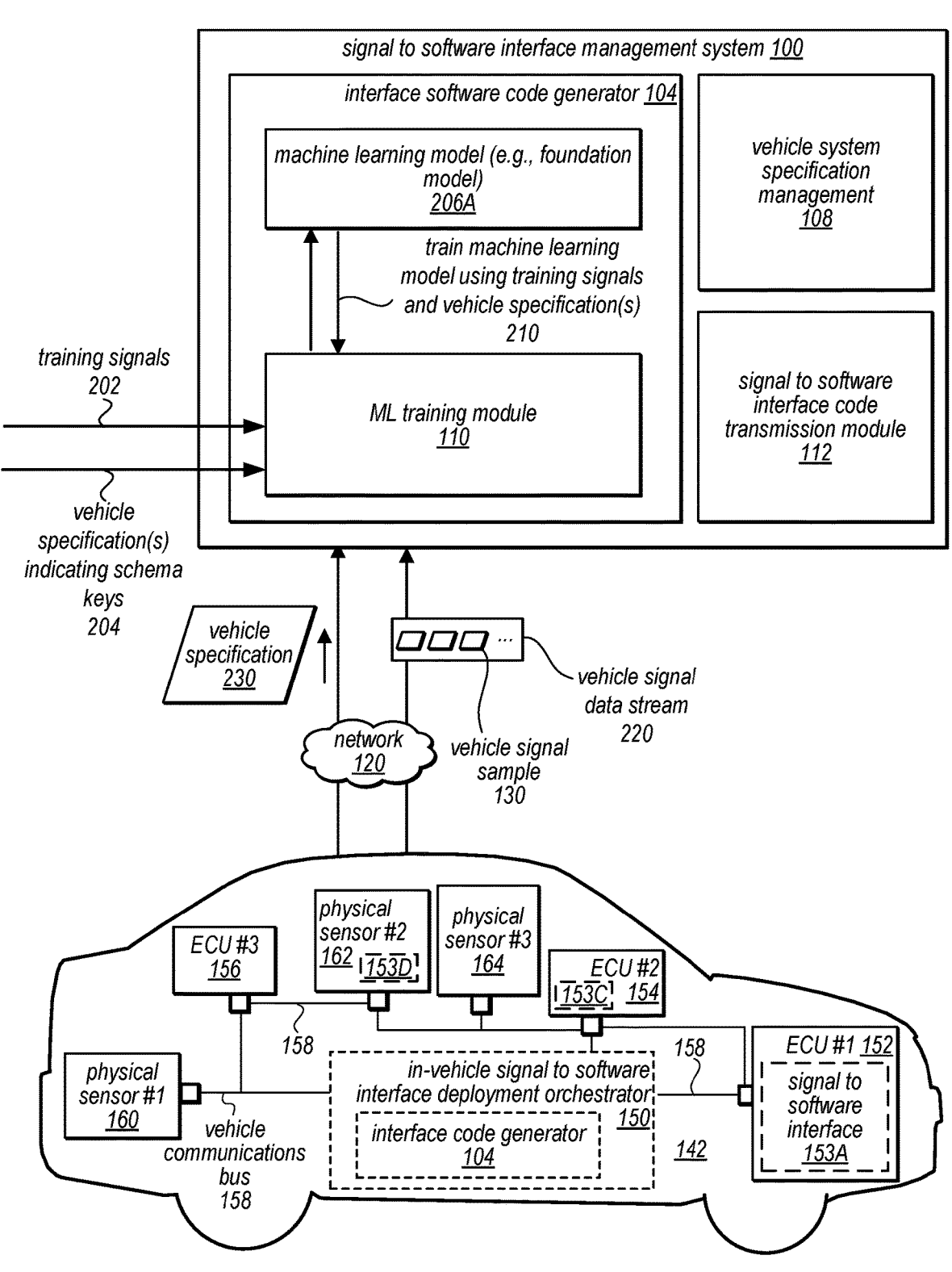
FIG. 2A illustrates a more detailed view of a signal to software interface management system that trains a machine learning model to generate code for implementing a signal to software interface, wherein the machine learning model is trained using vehicle system component signals and vehicle specifications, according to some embodiments.

FIG. 2A illustrates a more detailed view of a signal to software interface management system that trains a machine learning model to generate code for implementing a signal to software interface, wherein the machine learning model is trained using vehicle system component signals and vehicle specifications, according to some embodiments.

In some embodiments, an ML training module 110 may receive training signals 202 and vehicle specifications 204, wherein the vehicle specifications indicate schema keys 204. The receive training signals 202 and vehicle specifications 204 may be used to train a machine leaning model 206A. In some embodiments, the training signals 202 may comprise various sensor signals, ECU signals, vehicle actuator signals, and other vehicle signals. The training signals 202 may be used to train the machine learning model 206A to recognize vehicle signals of various types of vehicle components. The training signals 202 may furthermore comprise signals in various protocols. The various protocols that the training signals conform to may include a CAN protocol, CAN FD protocol, and SOME/IP protocol. In some embodiments, the vehicle specification 204 (e.g., a bill of materials (BOM)), may encompass a wide range of information pertaining to the vehicle system. The vehicle specification 204 may indicate various schema keys that represent various attributes of a vehicle component. For example, the vehicle specification 204 may indicate schema keys that catalogue all of the signals that are being produced by various vehicle system components of a vehicle (e.g., all of the components that generate signals in a car). The vehicle specification 204 may furthermore indicate the units of measurement and expected values (or range of values) of the various vehicle system components. In some embodiments, the ML training module 110 may receive multiple vehicle specifications for various types of vehicle systems (e.g., specification for various types of vehicles having different year, make, model, type of components, etc.) In some embodiments, signal to software interface management system 100 may receive vehicle specification 230 from a vehicle 142 for use in training the machine learning model 206A. In some embodiments, a vehicle signal data stream 220 may comprise vehicle signal sample 130, wherein the vehicle signal data stream 220 may be used to train the machine learning model 206A.

The ML training module 110 may train 210 the machine learning model 206A using the training signals 202 and the vehicle specifications indicating schema keys 204, wherein the machine learning model may be trained to generate software code for implementing a signal to software interface for a signal associated with a vehicle system component. In some embodiments, the machine learning model 206A may be a "foundation model". A foundation model may be a large neural network-based machine learning models that are trained initially (in a process often referred to as pre-training) using large amounts of data (such as millions of text sentence examples). The foundation model may be trained such that the resulting trained model may learn enough about a given input to be easily adapted for a plurality of different downstream tasks. Such models may be referred to as "large" because of the number of parameters that they each comprise (e.g., billions of parameters), and they may be referred to as "foundation" models in the sense that they can provide a foundation for performing many different kinds of inference or prediction tasks. Large language models (LLMs), typically pre-trained using natural language inputs, may be a type of foundation model, and may be used for a variety of applications including summarization, question-answering chatbots, classification and the like. A pre-trained foundation model may be fine-tuned (e.g., using a relatively small number of labeled examples) for specific use cases and specific problem domains in some cases, although the pre-trained version of a foundation model may itself be able to perform high-quality inference tasks in many cases. The pre-trained foundation models may be referred to as baseline foundation models or core foundation models to distinguish them from fine-tuned versions in some embodiments. The machine learning model 206A (e.g., the foundation model) may be trained using training signals comprising vehicle specification of a plurality of vehicle systems and training signals that are associated with a plurality of vehicle system components for a plurality of different vehicle systems.

Figure 2B:
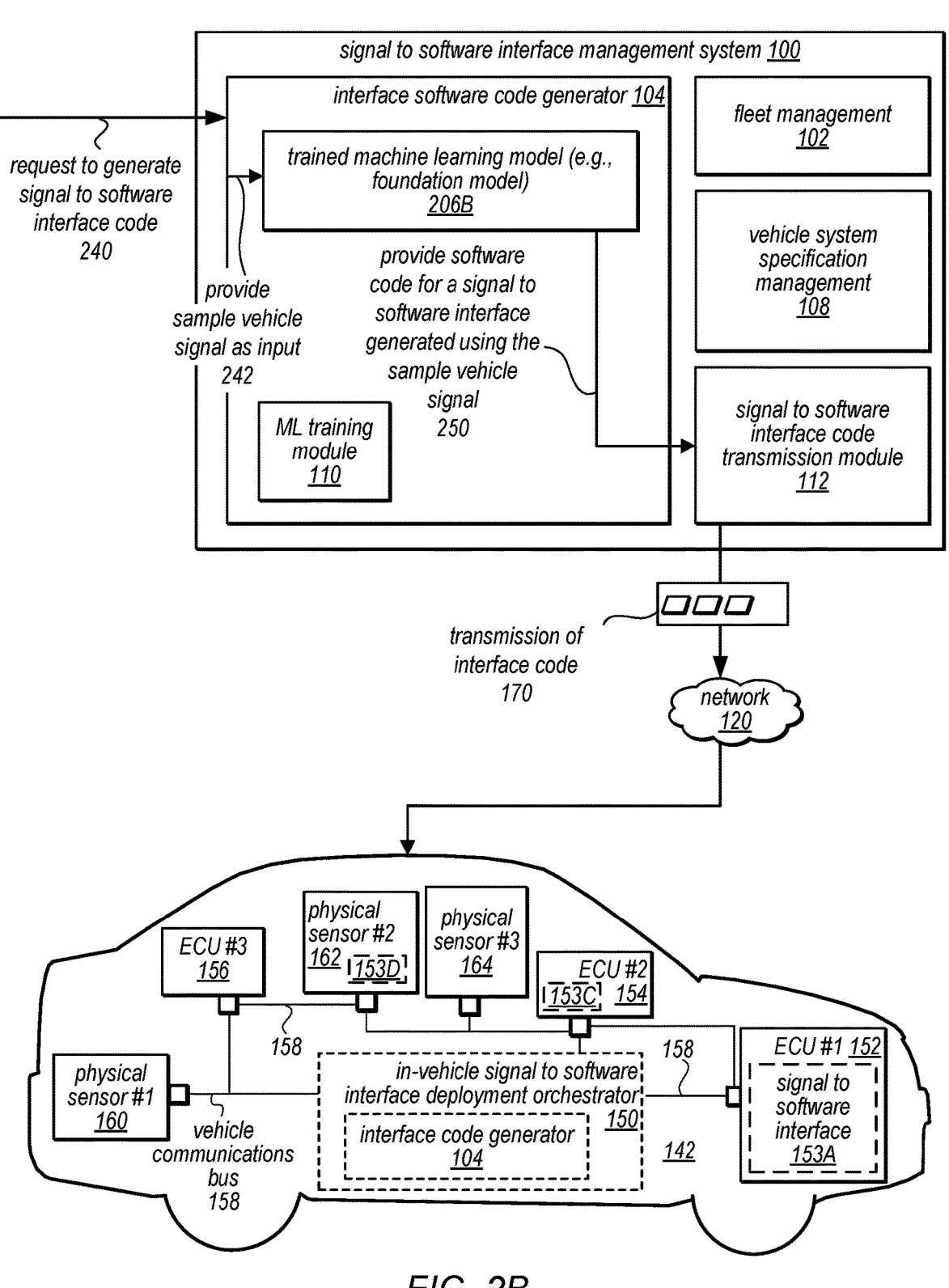
FIG. 2B illustrates a more detailed view of a signal to software interface management system that generates code for implementing a signal to software interface, wherein the signal to software interface management system provides the code for deployment to a vehicle, according to some embodiments.

FIG. 2B illustrates a more detailed view of a signal to software interface management system that generates code for implementing a signal to software interface, wherein the signal to software interface management system provides the code for deployment to a vehicle, according to some embodiments.

In some embodiments, a signal to software interface management system 100 may receive a request 240 to generate signal to software interface code. The request 240 may comprise information regarding a signal to software interface to be generated. In some embodiments, the information regarding the signal to software interface to be generated may include a deployment location of the signal to software interface, a signal of the vehicle system component to format, and a schema key that the signal is to be mapped to. In some embodiments, the request 240 to generate signal to software interface code may be a request for the signal to software interface management system 100 to determine (based on sample vehicle signal or another sample vehicle signal received) that the software code to implement the signal to software interface is to be updated and generating an updated signal to software interface. For example, a trained machine learning model 206B may determine after receiving a new sample vehicle signal that a new tire pressure sensor has been installed in a vehicle. The trained machine learning model 206B may determine that an updated software code for implementing an updated signal to software interface is to be generated based on the determination of the new tire pressure sensor.

In some embodiment, an interface software code generator 104 of the signal to software interface management system 100 may provide 242 a sample vehicle signal as input to a trained machine learning model 206B. The trained machine learning model 206B may be trained using one or more training signals, as discussed in FIG. 2A. The sample vehicle signal may be part of a vehicle signal data stream 220 as discussed in FIG. 2A. Using the sample vehicle signal, the trained machine learning model 206B may generate a software code for a signal to software interface. The trained machine learning model 206B may provide 250 the generated software code to software interface code trans- mission module 112. The signal to software interface code transmission module 112 may provide transmission of inter- face software code 170 to a vehicle 142 as discussed in FIG. 1A. In some embodiments, the software code for imple- menting the signal to software interface may be received at an in-vehicle signal to software interface deployment orchestrator 150, wherein the in-vehicle signal to software interface deployment orchestrator 150 deploys the software code at a deployment location of the vehicle (e.g., at ECU #1 (152) for signal to software interface 153A and at physical sensor #2 (162) for signal to software interface 153D). The in-vehicle signal to software interface deploy- ment orchestrator 150 is further discussed in FIG. 3. In some embodiments, the software code is provided directly to the deployment location in the vehicle (e.g., software code provided directly to the ECU #1 (152) to implement the signal to software interface 153A).

Figure 3:
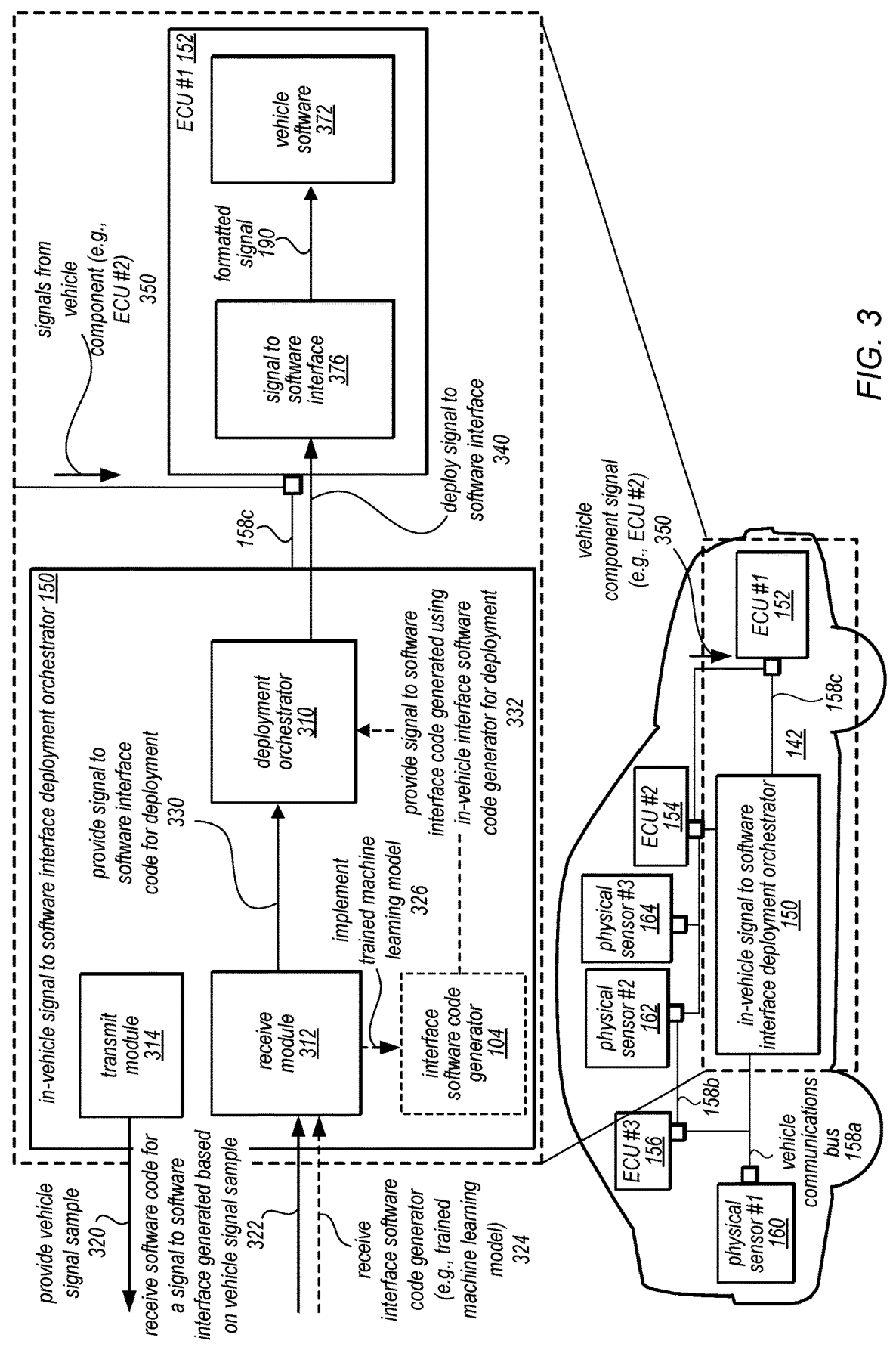
FIG. 3 illustrates a more detailed view of an in-vehicle signal to software interface deployment orchestrator of a vehicle that deploys a signal to software interface to a vehicle system destination at a vehicle component of the vehicle, according to some embodiments.

FIG. 3 illustrates a more detailed view of an in-vehicle signal to software interface deployment orchestrator of a vehicle that deploys a signal to software interface to a vehicle system destination at a vehicle component of the vehicle, according to some embodiments.

In some embodiments, at least a portion of a signal to software interface management system may be implemented in a vehicle 142. For example, an in-vehicle signal software interface deployment orchestrator 150 of a signal to software interface management system may be implemented in the vehicle 142. In some embodiments, the in-vehicle signal software interface deployment orchestrator 150 may com- prise a transmit module 314, a receive module 312, and a deployment orchestrator 310.

In some embodiments, the transmit module 314 may provide 320 a vehicle signal sample to the signal to software interface management system for training a machine learn- ing model and/or for generating a signal to software inter- face. In some embodiments, the provided vehicle signal sample may be one or more portions from signals from vehicle component 350, such as signals from ECU #2 (154). In some embodiments, the receive module 312 may receive 322 software code for a signal to software interface, wherein the software code is generated based on the vehicle signal sample that was provided by the transmit module 314. The receive module 312 may provide 330 a signal to software interface code for deployment to the deployment orchestra- tor 310. In some embodiments, the deployment orchestrator 310 may deploy 340 the software code for implementing a signal to software interface to a deployment location (e.g., ECU #1 (152)). In some embodiments, once deployed, a signal to software interface 376 may receive signals 350 from a vehicle component (e.g., ECU #2 (154)) and may map the signal to the correct schema key associated with the vehicle component (e.g., ECU #2 (154)). The deployed signal to software interface 376 may format the signals 350 according to a schema associated with the schema key and may provide a formatted signal 190 to vehicle software 372.

In some embodiments, the receive module 312 may receive 324 an interface software code generator for use in the in-vehicle signal software interface deployment orches- trator 150. For example, the receive module 312 may receive a trained machine learning model that has been trained to generate software code for implementing a signal to soft- ware interface. In some embodiments, the trained machine learning model may be a trained foundation model as further discussed in FIG. 2A. In some embodiments, the in-vehicle signal software interface deployment orchestrator 150 may implement 326 the trained machine learning model as part of an interface software code generator 104 of the vehicle 142. In some embodiments, the interface software code generator 104 may obtain a sample vehicle component signal (e.g., signals from ECU #2 (154)) and may generate a software code for implementing the signal to software interface 376. The interface software code generator 104 may provide 332 the generated code for deployment at ECU #1 (152).

FIG. 4 illustrates a flowchart of operations performed by a signal to software interface management system to gen- erate software code for implementing a hardware signal to software interface, according to some embodiments.

At block 410, a sample vehicle system signal comprising data related to a vehicle system component is provided as input to a trained machine learning model for a signal software interface management system. In some embodi- ments, the trained machine learning model may be a machine learning that has been trained using training signals comprising a plurality of types of vehicle signals, and wherein the trained machine learning model has been trained for one or more vehicle system specifications, as further discussed in FIGS. 1A and 2A.

At block 420, software code to implement a signal to software interface may be generated based on the sample vehicle system signal provided, wherein the signal to soft- ware interface is configured to map a vehicle system com- ponent signal to a schema key associated with the vehicle component and format the vehicle system component signal for use by the vehicle software component according to a schema associated with the schema key. In some embodi- ments, the vehicle system component signal may be directed to, or received from, the vehicle system component to the schema key associated with the vehicle component. In some embodiments, the schema key may be used to represent one or more attributes of the vehicle system component signal in a communication used by a given vehicle software as further discussed in FIGS. 1A-1C.

At block 430, the generated software code may be pro- vided to a deployment location to implement the signal to software interface. In some embodiments, the software code for implementing the signal to software interface may be deployed directly to a deployment location in a vehicle or in a cloud provider network. In some embodiments, the soft- ware code may be sent to an in-vehicle signal to software interface deployment orchestrator, as discussed in FIG. 3.

FIG. 5 illustrates a flowchart of operations performed by a signal to software interface management system to gen- erate an updated software code for use in updating a signal to software interface, according to some embodiments.

At block 510, another sample vehicle signal comprising updated data related to a same type of vehicle component as the vehicle component may be received. In some embodi- ments, the other sample vehicle signal may be based on a trained machine learning detecting based on the other sample vehicle signal that the software code to implement the signal to software interface is to be updated, as further discussed in FIG. 2B.

At block 520, the other sample vehicle signal may be provided to the trained machine learning model. In some embodiments, the other sample vehicle signal may be provided to a trained foundation model that is configured to generate software code for implementing a s signal to software interface for a plurality of different vehicle systems, as further discussed in FIG. 2A.

At block 530, the software code to implement the hardware signal to software interface is determined to be updated based on the other sample vehicle signal. At block 540, an updated software code to update the hardware signal to software interface is generated based on the other sample vehicle signal. In some embodiments, the updated signal to software interface is configured to map the vehicle component signal generated by the vehicle component of the same type as the vehicle component to the schema key associated with the vehicle component, as further discussed in FIG. 2B.

FIG. 6 illustrates a flowchart of operations performed by a signal to software interface management system to train a machine learning model to generate software code for use in implementing a signal to software interface, wherein the machine learning model is a foundation model, according to some embodiments.

At block 610, a signal software interface management system receives training signals, wherein the plurality of types of vehicle signals of the training signals are associated with a plurality of vehicle system components for a plurality of different vehicle systems. In some embodiments, the received training signals may be compressed signals that conform to a binary format or a protocol buffer format. In some embodiments, the received training signals may conform to a plurality of different protocols (such as CAN, CAN FD, SOME/IP), as further discussed in FIG. 1A.

At block 620, a plurality of vehicle system specifications for the plurality of different vehicle systems are received. In some embodiments, the vehicle system specification may be formatted according to one or more different file types, such as DBC or XML, as further discussed in FIG. 1A.

At block 630, To generate the trained machine learning model, a foundation model is trained using the training signals associated with the plurality of vehicle system components for the plurality of different vehicle systems. In some embodiments, the trained foundation model may be configured to generate software code for implementing a signal to software interface for a plurality of different vehicle systems, as further discussed in FIG. 2A.

Example Computer System

Figure 7:
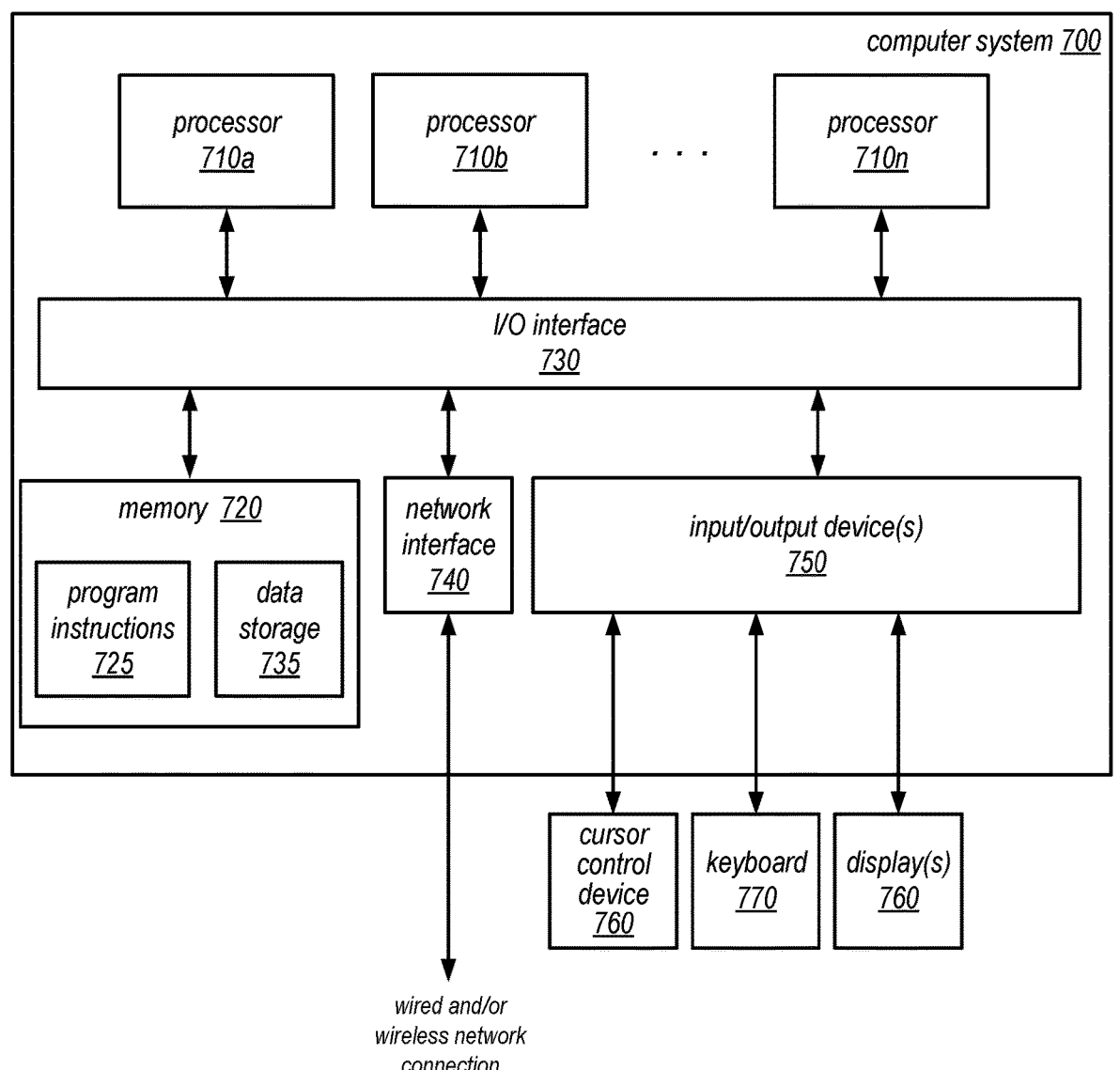
FIG. 7 illustrates a block diagram illustrating an example computer system that implements some, or all, of the techniques described herein, according to some embodiments.

Any of various computer systems may be configured to implement processes associated with a signal to software interface management system or any other component of the above figures. For example, FIG. 7 illustrates a block diagram illustrating an example computer system that implements some, or all, of the techniques described herein, according to some embodiments. In various embodiments, the signal to software interface management system, the provider network that is used to deploy the signal to software interface management system and other cloud services, the operating system in a vehicle or device, the resource provisioning control software, or any other component of the above figures FIGS. 1-6 may each include one or more computer systems 700 such as that illustrated in FIG. 7.

In the illustrated embodiment, computer system 700 includes one or more processors 77 coupled to a system memory 720 via an input/output (I/O) interface 730. Computer system 700 further includes a network interface 740 coupled to I/O interface 730. In some embodiments, computer system 700 may be illustrative of servers implementing enterprise logic or that provide a downloadable application, while in other embodiments servers may include more, fewer, or different elements than computer system 700.

In various embodiments, computing device 700 may be a uniprocessor system including one processor or a multiprocessor system including several processors 710a-710n (e.g., two, four, eight, or another suitable number). Processors 710a-710n may include any suitable processors capable of executing instructions. For example, in various embodiments, processors 710a-710n may be processors implementing any of a variety of instruction set formats (ISAs), such as the x86, PowerPC, SPARC, or MIPS ISAs, or any other suitable ISA. In some embodiments, processors 710a-710n may include specialized processors such as graphics processing units (GPUs), application specific integrated circuits (ASICs), etc. In multiprocessor systems, each of processors 710a-710n may commonly, but not necessarily, implement the same ISA.

System memory 720 may be configured to store program instructions and data accessible by processor(s) 710a-710n. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (e.g., program instructions) 725 and data storage 735.

In one embodiment, I/O interface 730 may be configured to coordinate I/O traffic between processors 710a-710n, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, I/O interface 730 may include support for devices attached via an automotive may bus, etc. In some embodiments, the function of I/O interface 730 may be split into two or more separate components, such as a north bridge and a south bridge, for example. Also, in some embodiments, some, or all of the functionality of I/O interface 730, such as an interface to system memory 720, may be incorporated directly into processors 710a-710n.

In some embodiments, the network interface 740 may be coupled to I/O interface 730, and one or more input/output devices 750, such as cursor control device 760, keyboard 770, and display(s) 7100. In some cases, it is contemplated that embodiments may be implemented using a single instance of computer system 700, while in other embodiments multiple such computer systems, or multiple nodes making up computer system 700, may be configured to host different portions or instances program instructions as described above for various embodiments. For example, in one embodiment some elements of the program instructions may be implemented via one or more nodes of computer system 700 that are distinct from those nodes implementing other elements.

Network interface 740 may be configured to allow data to be exchanged between computing device 700 and other devices associated with a network or networks. In various embodiments, network interface 740 may support communication via any suitable wired or wireless general data networks, such as types of ethernet networks, cellular networks, Bluetooth networks, Wi-Fi networks, Ultra-wideband Networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 700 via I/O interface 730. One or more non-transitory computer-readable storage media may also include any volatile or non-volatile media such as RAM (e.g., SDRAM, DDR SDRAM, RDRAM, SRAM, etc.), ROM, etc., that may be included in some embodiments, of computing device 700 as system memory 720 or another type of memory. Further, a computer-readable medium may include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM. DDR. RDRAM. SRAM, etc.). ROM, etc., as well as transmission media or signals such as electrical, electromagnetic, or digital signals, conveyed via a communication medium such as network and/or a wireless link.

What is claimed is:

1. A system, comprising:
one or more computing devices configured to implement a hardware software interface management system configured to:
provide as input, to a trained machine learning model, a sample vehicle signal comprising data related to a vehicle component of a vehicle, wherein the machine learning model has been trained using training signals comprising a plurality of types of vehicle signals, and wherein the machine learning model has been trained for one or more vehicle specifications;
generate, based on the sample vehicle signal provided, software code to implement a hardware signal to software interface to be deployed in the vehicle, wherein the hardware signal to software interface is configured to:
map a vehicle component signal directed to, or received from, the vehicle component to a schema key associated with the vehicle component, wherein the schema key is used to represent one or more attributes of the vehicle component signal in a communication used by a given vehicle software for the vehicle; and
format the vehicle component signal for use by the vehicle software according to a schema associated with the schema key; and
provide the generated software code to a deployment location in the vehicle to implement the hardware signal to software interface.

2. The system of claim 1, wherein the one or more computing devices that implement the hardware software interface management system are part of a cloud provider network, wherein the hardware software interface management system is configured to:
receive the sample vehicle signal from the vehicle; and
provide the generated software code to the vehicle for deployment to the deployment location in the vehicle.

3. The system of claim 1, wherein the one or more computing devices that implement the hardware software interface management system are part of the vehicle, wherein the hardware software interface management system is configured to:
deploy the generated software code to the deployment location in the vehicle.

4. The system of claim 1, wherein the hardware software interface management system is configured to:
receive another sample vehicle signal comprising updated data related to a same type of vehicle component as the vehicle component;
provide the other sample vehicle signal to the trained machine learning model;
determine, based on the other sample vehicle signal, that the software code to implement the hardware signal to software interface is to be updated; and
generate, based on the other sample vehicle signal, an updated software code to update the hardware signal to software interface, wherein the updated hardware signal to software interface is configured to map the vehicle component signal generated by the vehicle component of the same type as the vehicle component to the schema key associated with the vehicle component.

5. A method, comprising:
providing as input, to a trained machine learning model for a signal software interface management system, a sample vehicle system signal comprising data related to a vehicle system component of a vehicle, wherein the machine learning model has been trained using training signals comprising a plurality of types of vehicle signals, and wherein the machine learning model has been trained for one or more vehicle system specifications;
generating, based on the sample vehicle system signal provided, software code to implement a signal to software interface to be deployed in the vehicle, wherein the signal to software interface is configured to:
    map a vehicle system component signal directed to, or received from, the vehicle system component to a schema key associated with the vehicle system component, wherein the schema key is used to represent one or more attributes of the vehicle system component signal in a communication used by a given vehicle software for the vehicle; and
    format the vehicle system component signal for use by the vehicle software according to a schema associated with the schema key; and
    providing the generated software code to a deployment location in the vehicle to implement the signal to software interface.

6. The method of claim 5, further comprises:
receiving, using the signal software interface management system, the training signals, wherein:
    the plurality of types of vehicle signals of the training signals are associated with a plurality of vehicle system components for a plurality of different vehicle systems; and
    receiving, a plurality of vehicle system specifications for the plurality of different vehicle systems; and
    to generate the trained machine learning model, training the machine learning model using the training signals associated with the plurality of vehicle system components for the plurality of different vehicle systems.

7. The method of claim 6, wherein the method further comprises:
providing as input, to the trained machine learning model, another sample vehicle system signal associated with another vehicle system component, wherein:
    the vehicle system component is associated with a vehicle model;
    the other vehicle system component is associated with a different vehicle model; and
    generating, based on the other sample vehicle system signal, another software code to implement another signal to software interface to be deployed to the other vehicle system component associated with the different vehicle model.

8. The method of claim 5, wherein:
the vehicle system component is another signal to software interface;
the sample vehicle system signal is a processed vehicle system signal generated by the other signal to software interface; and
the signal to software interface is configured to format the vehicle system component signal from another schema associated with another schema key of the other signal to software interface to conform to the schema.

9. The method of claim 5, wherein the signal to software interface management system is implemented as part of a cloud provider network, and
wherein the method further comprises:
    receiving the sample vehicle system signal from a vehicle; and
    providing the generated software code to the vehicle for deployment to the deployment location in the vehicle.

10. The method of claim 9, further comprising:
receiving at a deployment orchestrator of the vehicle, the generated software code; and
deploying using the deployment orchestrator the generated software code to the deployment location in the vehicle, wherein the deployment location is a component in the vehicle.

11. The method of claim 5, wherein the signal to software interface management system, including the trained machine learning model, is implemented as part of a vehicle, and wherein the method further comprises:
deploying the generated software code to the deployment location in the vehicle.

12. The method of claim 5, wherein the vehicle system component signal conforms to:
a Controller Area Network (CAN) protocol;
a Controller Area Network Flexible Data-rate (CAN FD) protocol; or
a service-Oriented MiddlewarE over IP (SOME/IP) protocol.

13. The method of claim 5, wherein the vehicle system component signal is a compressed signal, wherein the compressed signal conforms to:
a binary format; or
a protocol buffer format.

14. The method of claim 5, further comprising:
receiving another sample vehicle system signal comprising updated data related to a same type of vehicle system component as the vehicle system component;
providing the other sample system vehicle signal to the trained machine learning model;
determining, based on the other sample vehicle system signal, that the software code to implement the signal to software interface is to be updated; and
generating, based on the other sample vehicle system signal, an updated software code to update the signal to software interface, wherein the updated signal to software interface is configured to map the vehicle system component signal generated by the vehicle system component of the same type as the vehicle system component to the schema key associated with the vehicle system component.

15. One or more non-transitory, computer-readable storage media, storing program instructions that when executed on or across one or more computing devices cause the one or more computing devices to implement:
providing as input, to a trained machine learning model for a signal software interface management system, a sample vehicle system signal comprising data related to a vehicle system component of a vehicle, wherein the machine learning model has been trained using training signals comprising a plurality of types of vehicle signals, and wherein the machine learning model has been trained for one or more vehicle system specifications;
generating, based on the sample vehicle system signal provided, software code to implement a signal to software interface to be deployed in the vehicle, wherein the signal to software interface is configured to:

map a vehicle system component signal directed to, or received from, the vehicle system component to a schema key associated with the vehicle system component, wherein the schema key is used to represent one or more attributes of the vehicle system component signal in a communication used by a given vehicle software for the vehicle; and format the vehicle system component signal for use by the vehicle software according to a schema associated with the schema key; and providing the generated software code to a deployment location in the vehicle to implement the signal to software interface.

16. The one or more non-transitory, computer-readable, storage media of claim 15, wherein the signal to software interface management system are implemented as part of a cloud provider network, and wherein the instructions cause the one or more computing devices to implement:

receiving the sample vehicle system signal from a vehicle; and providing the generated software code to the vehicle for deployment to the deployment location in the vehicle.

17. The one or more non-transitory, computer-readable, storage media of claim 16, wherein the instructions cause the one or more computing devices to implement:

receiving at a deployment orchestrator of the vehicle, the generated software code; and deploying using the deployment orchestrator the generated software code to the deployment location in the vehicle, wherein the deployment location is a component in the vehicle.

18. The one or more non-transitory, computer-readable, storage media of claim 15, wherein the signal to software interface management system, including the trained machine learning model, is implemented as part of a vehicle, and wherein the instructions cause the one or more computing devices to implement:

deploying the generated software code to the deployment location in the vehicle.

19. The one or more non-transitory, computer-readable, storage media of claim 15, wherein the instructions cause the one or more computing devices to implement:

receiving, using the signal software interface management system, the training signals, wherein:

the plurality of types of vehicle signals of the training signals are associated with a plurality of vehicle system components for a plurality of different vehicle systems; and receiving, a plurality of vehicle system specifications for the plurality of different vehicle systems; and to generate the trained machine learning model, training the machine learning model using the training signals associated with the plurality of vehicle system components for the plurality of different vehicle systems.

20. The one or more non-transitory, computer-readable, storage media of claim 19, wherein the instructions cause the one or more computing devices to implement:

providing as input, to the trained machine learning model, another sample vehicle system signal associated with another vehicle system component, wherein:

the vehicle system component is associated with a vehicle model; and the other vehicle system component is associated with a different vehicle model;

generating, based on the other sample vehicle system signal, another software code to implement another signal to software interface to be deployed to the other vehicle system component associated with the different vehicle model.

* * * * *